Patented Sept. 10, 1935

2,013,717

UNITED STATES PATENT OFFICE 2,013,717

BARBITURIC ACID-HYDANTOIN COMPOUND

Simon L. Ruskin, New York, N. Y., assignor to Frances R. Ruskin, New York, N. Y.

No Drawing. Application May 26, 1933,
Serial No. 673,027

7 Claims. (Cl. 260—33)

This invention relates to a new method and preparation for the treatment of diseases and relates more particularly to pharmaceutical compounds which combine in themselves the valuable properties of barbituric acid derivatives and hydantoin derivatives.

Hydantoin derivatives, especially the 5, 5'-phenyl ethyl hydantoin, are used in medicine as hypnotics and sedatives and are of special value in the treatment of chorea minor and epilepsy. These products, however, produce toxic effects, which consist in eruptions, cyanotic swelling of the face, and rise in temperature, and which are known under the name of "nirvanol disease"; therefore the application of these compounds is limited considerably in spite of their specific therapeutical action.

The term "hydantoin derivatives" as used hereinafter in the specification and the claims, characterizes compounds which are represented by the following general formula:

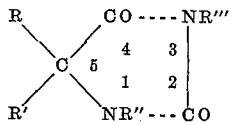

wherein the numbers 1 to 5 represent the positions which various substitutents may occupy while R, R'', R''' represent either hydrogen or any other substituent, such as an alkyl radical, for instance the methyl, ethyl, propyl, isopropyl, butyl, isobutyl, allyl, or the like, or an aryl or aralkyl radical, such as phenyl, benzyl, or the like, which radicals may be substituted by any suitable substituent, for instance by halogen, especially bromine, the hydroxyl, carboxyl, amino, and the like groups, or other substituents such as halogen, hydroxyl, amino and the like groups and R' represents any substituted or unsubstituted alkyl, aryl or aralkyl radical. They are easily obtained by reacting the corresponding α-amino acids with potassiumcyanate or with urea and baryta water, whereafter the first obtained α-ureido acids are boiled with diluted sulfuric acid in order to effect ring closure, according to the following formulas:

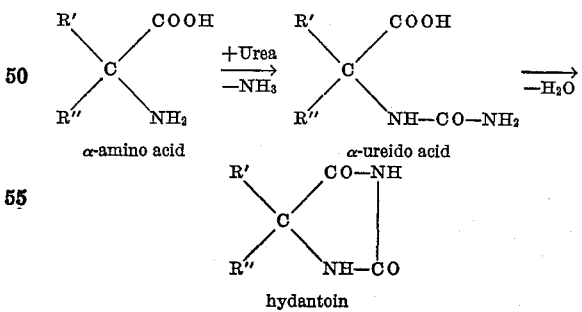

Of course, other methods of preparation are also used, so for instance hydantoin derivatives are obtained by means of cyanoacetic esters and alkyl iodides over the corresponding alkyl cyano acetamides.

The term "barbituric acid derivatives" as used hereinafter in the specification and in the claims characterizes compounds which are used for a long time as hypnotics and sedatives. Their constitution corresponds to the following general formula:

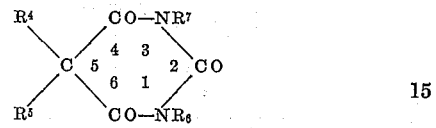

wherein the numbers 1 to 6 represent positions which various substituents may occupy while $R^4$, $R^6$ and $R^7$ represent either hydrogen or an alkyl radical, such as methyl, ethyl, propyl, isopropyl, butyl, isobutyl, amyl, allyl, or the like, or an aryl or aralkyl radical, such as phenyl, benzyl, or the like, which radicals may be substituted by any suitable substituent, for instance by halogen, especially bromine, the hydroxyl, carboxyl, amino and the like groups, or other substituents such as halogen, hydroxyl, carboxyl, amino, and the like groups and $R^5$ represents any substituted or unsubstituted alkyl, aryl or aralkyl radical.

Barbituric acid derivatives are obtained by condensation of the alkylated or arylated malonic acids with urea in the presence of sodium alcoholate according to the following formulas:

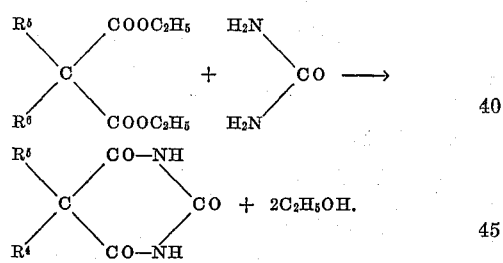

Other methods of preparation are also known and may be employed for obtaining the barbituric acid derivatives to which the present invention refers. The following barbituric acid derivatives, are especially known in medicine, although others may be employed just as well:

5,5'-diethyl barbituric acid (veronal)

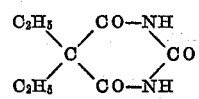

N-dibromo propyl-5,5'-diethyl barbituric acid (diogenal)

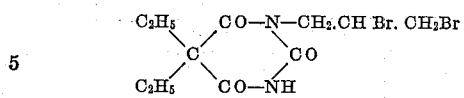

5,5'-dipropyl barbituric acid (proponal)

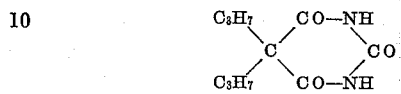

5,5'-diallyl barbituric acid (dial)

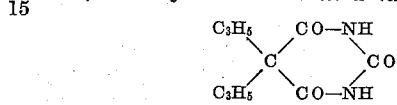

5,5'-allyl isopropyl barbituric acid (allonal)

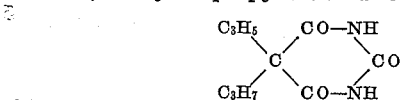

5,5'-phenyl ethyl barbituric acid (luminal)

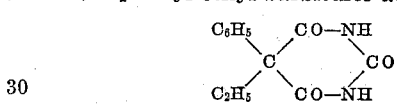

The main object of the present invention is to combine barbituric acid derivatives with hydantoin derivatives so as to obtain a medicinal preparation having very valuable properties which surpass those of the individual components considerably. These combinations have the advantages over each component, that the sedative as well as the hypnotic effects are of much longer duration, so that the doses to be administered may be considerably smaller. Hence, also the bad circulatory influence of the hydantoins which tends to cause pronounced lowering of the white blood corpuscles, is diminished. The nerve sedative effect of the hydantoins is considerably increased and, thus, a preparation is available which represents a specificum in chorea minor.

Another object of this invention consists in combining hydantoin derivatives and barbituric acid derivatives so as to form compounds of the following general formula:

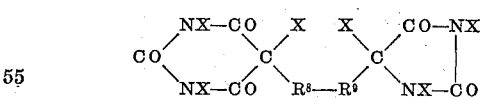

wherein $R^8$ and $R^9$ represent any substituted or unsubstituted alkyl, aryl or aralkyl radicals which are linked together so as to combine chemically the hydantoin and the barbituric acid derivatives and X represents either hydrogen or any other substituent, such as substituted or unsubstituted alkyl, aryl or aralkyl radicals or other substituents such as halogen, hydroxyl, carboxyl, amino and the like groups.

A further object of this invention is to combine hydantoin and barbituric acid derivatives so as to form compounds of the following formula:

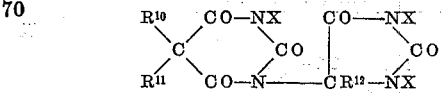

wherein $R^{10}$, $R^{11}$, $R^{12}$ and X represent either hydrogen or any other substituent, such as substituted or unsubstituted alkyl, aryl or aralkyl radicals or other substituents such as halogen, hydroxyl, carboxyl, amino and the like groups. Such a compound can be obtained for instance, by reacting allantoin or its derivatives of the following formula:

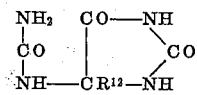

with dialkyl malonic acid esters in the presence of sodium alcoholate.

Another object of this invention consists in combining alloxan and hydantoin derivatives so as to form compounds of the following general formula:

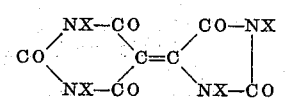

wherein X represents either hydrogen or any other substituent, such as substituted or unsubstituted alkyl, aryl or aralkyl or other substituents, such as halogen, hydroxyl, carboxyl, amino and the like groups.

A further object of this invention consists in transforming the above mentioned unsaturated combination product of alloxan and hydantoin derivatives into compounds of the following general formula:

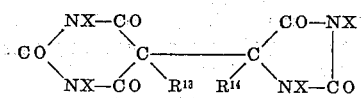

wherein X, $R^{13}$ and $R^{14}$ represent either hydrogen or any other substituent, such as substituted or unsubstituted alkyl, aryl or aralkyl radicals or other substituents, such as halogen, hydroxyl, carboxyl, amino and the like groups.

Still another object of this invention comprises a molecular compound of one molecule of a barbituric acid derivative with one or two molecules of a hydantoin derivative which may be obtained by fusing the two components together.

A further object of this invention is to provide a product adapted for administration in the therapy of chorea minor, epilepsy and the like diseases which comprises a combination of a barbituric acid derivative with a hydantoin derivative which product combines in itself the valuable properties of the two components to an extent greater than if the two components were administered separately.

These and further objects of the invention will become evident from the explanations set forth in the following description of the invention.

For the purpose of disclosing the invention I will describe the preparation of the combination of phenyl ethyl barbituric acid (luminal) with β-chloro allyl isopropyl hydantoin by means of the Friedel-Crafts synthesis, of the combination of allantoin with diethyl malonic acid ester in the presence of sodium alcoholate, of the combination of alloxan with hydantoin under the influence of dehydrating agents, and of the molecular compound from one molecule of phenyl ethyl hydantoin (nirvanol) and one molecule of phenyl ethyl barbituric acid (luminal).

Example 1

Combination of phenyl ethyl barbituric acid with β-chloro allyl isopropyl hydantoin by the Friedel-Crafts synthesis.

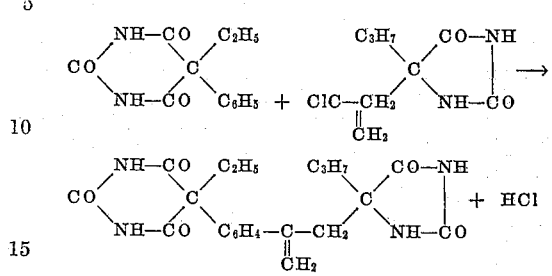

232 g. (1 molecule) of phenyl ethyl barbituric acid is dissolved in the necessary amount of carbon disulfide; to this solution a solution of 216,5 g. (1 molecule) of β-chloro allyl isopropyl hydantoin is given, and, while boiling under reflux and stirring vigorously, 250 g. of powdered aluminum chloride are added gradually within two hours. After the reaction is completed, the reaction mixture is carefully and gradually diluted with water, while cooling. The reaction product is thereafter extracted by ether or any other suitable solvent, and the crude product obtained after evaporating the solvent is purified either by recrystallization from a suitable solvent, such as alcohol or ether, or the like, or by dissolving in dilute sodium hydroxide solution and reprecipitation by hydrochloric acid and washing with water.

Of course, this represents only an example of the production of a combination of hydantoin and barbituric acid derivatives. One can also proceed by first reacting phenyl ethyl barbituric acid with propylene dichloride, $$CH_2=CCl-CH_2Cl$$

and condensing the obtained product with isopropyl cyano acetamide to the above described hydantoin derivative. Instead of aluminum chloride, also ferric chloride or zinc chloride may be used. Instead of carbon disulfide other solvents, such as petrol ether, nitrobenzene and the like may be employed. Good results are, for in-

stance, obtained by dissolving the components in a mixture of glacial acetic acid and hydrochloric acid and adding thereto aluminum chloride. It is also possible first to condense the corresponding malonic acid esters with hydantoin derivatives and then to produce the barbituric acid compounds by reacting with urea in the presence of sodium alcoholate. Or one may condense the corresponding malonic acid ester with an alkyl, aryl, dialkyl, diaryl, aryl alkyl α-amino acid, whereafter by reaction with urea and sodium alcoholate formation of a barbituric acid derivative and by reaction with urea and baryta water ring closure to a hydantoin derivative take place.

When substituting in this reaction β-chloroallyl isopropyl hydantoin by chloro phenyl ethyl hydantoin a compound of the following formula is obtained:

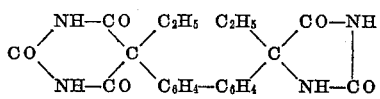

Example 2

Combination of allantoin with diethyl malonic ester.

The reaction takes place according to the following equation:

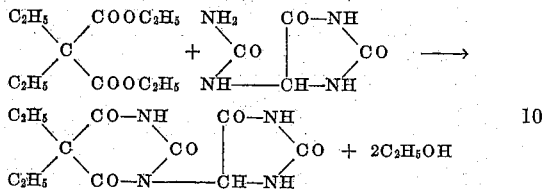

To 500 cc. of absolute alcohol, 60 g. of metallic sodium are added gradually. Thereafter, 160 g. of well dried allantoin and 215 g. of diethyl malonic acid diethyl ester are given to the alcoholate, while cooling to 50 degrees. The mixture is heated for several hours under reflux, the alcohol is distilled off and water is added to destroy any metallic sodium present; after acidifying, the mass is filtered and washed with water. The crude product is purified by dissolving it in a suitable solvent (alcohol or the like) and crystallizing it or is reprecipitated from its alkaline solution with acids.

Of course, other allantoin derivatives may be used instead of allantoin itself. Instead of diethyl malonic acid ester, other mono and dialkyl, aryl, aralkyl esters or the diamides, dichlorides or other derivatives of the alkyl, aryl or aralkyl malonic acid or the dialkyl cyano acetic acid esters and the like, may be employed.

It is furthermore possible to condense a compound obtained from allantoin derivatives with malonic acid derivatives, which represent barbituric acid derivatives, with another molecule of hydantoin derivatives according to Example 1, by the Friedel-Crafts synthesis, such as for instance corresponds to the following formula:

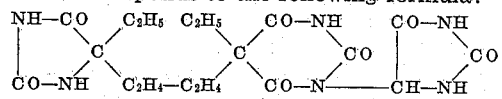

Example 3

Combination of alloxan with hydantoin.
The reaction takes place according to the following equation:

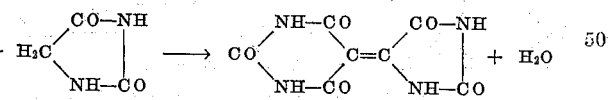

8 gms. of alloxan are boiled in 150 gms. of acetic acid containing 5 gms. of acetic anhydride. As soon as all of the alloxan is dissolved, 2 more grams of acetic anhydride are added, thereafter 10 gms. of fused sodium acetate and 5 gms. of hydantoin.

The reaction mixture is then heated for three hours at 140 to 150 degrees under reflux in an oil bath. On cooling a brick-red precipitate is obtained which is filtered, dried and extracted with water. By heating with acetone a precipitate is produced consisting of brick-red needles. On recrystallization by dissolving in hot water and precipitation with an equal volume of acetone light-rose needles are obtained. Of course, it is possible to employ other dehydrating agents, such as concentrated sulfuric acid alone or preferably in the presence of diluents, such as acetic acid and the like.

The isolation of the reaction product may also be carried out in a different way. The acetic acid may e. g. be mostly removed by distillation and the remaining mixture be thrown into water.

Other compounds of similar constitution may be used instead of alloxan and hydantoin, e. g. the alkyl, halogen, amino and the like derivatives, which combine equally well with each other.

In order to produce more effective products, the double bond between the alloxan and the hydantoin radical may be transformed into a single bond whereby the free valencies are occupied by any suitable substituent, such as alkyl, aryl, aralkyl radicals, amino, halogen and the like groups. Thereby compounds of the following general formula are obtained:

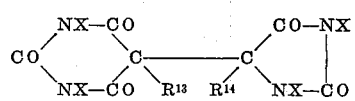

wherein X, $R^{13}$ and $R^{14}$ represent either hydrogen or any other substituent, such as substituted or unsubstituted alkyl, aryl or aralkyl radicals or other substituents, such as halogen, hydroxyl, amino and the like groups.

*Example 4*

Molecular compound of phenyl ethyl hydantoin and phenyl ethyl barbituric acid. 1 mol. of phenyl ethyl hydantoin and 1 mol. of phenyl ethyl barbituric acid are fused together. On cooling, the crystalline molecular compound of phenyl ethyl hydantoin and phenyl ethyl barbituric acid is obtained which may be converted into tablets or any other suitable form for therapeutical administration.

Other molecular compounds of different components may be obtained in the same manner whereby the molecular proportion of the two components may vary according to the properties of the latter.

The combination of hydantoin and barbituric acid derivatives may be carried out in any other way than the above described ones. Thus, it is possible to combine the halogenated hydantoin and barbituric acid derivatives by the Fittig-Wurtz synthesis by the action of metallic sodium, for instance according to the following equation:

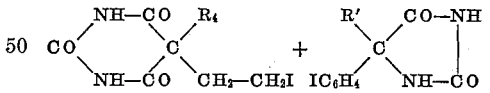

Other combinations of hydantoin derivatives and barbituric acid compounds may be produced and employed as new hypnotica, sedativa and specifica in the treatment of chorea and epilepsy. It may be especially mentioned that, the optically active hydantoins, in particular the dextro forms on combination with barbituric acid derivatives yield products which do not show any of the disadvantages of the known hydantoins.

But all the mentioned examples serve merely to illustrate the invention which is by no means limited to them; as modifications may be made by those skilled in the art in accordance with the principles set forth herein and in the claims annexed hereto.

What I claim is:

1. A new product corresponding to the following formula:

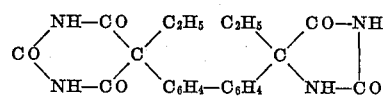

and representing the combination of phenyl ethyl barbituric acid with phenyl ethyl hydantoin.

2. A new product, comprising the molecular compound of one molecule of phenyl ethyl hydantoin and one molecule of phenyl ethyl barbituric acid.

3. A new product corresponding to the following formula:

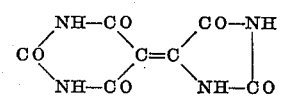

and representing the combination of alloxan with hydantoin.

4. A new product consisting essentially of the reaction product of a barbituric acid and a hydantoin.

5. A new product consisting essentially of the reaction product of a barbituric acid and a hydantoin, the latter being an optically active form.

6. A new product consisting essentially of the reaction product of a barbituric acid and a hydantoin, wherein a carbon atom of the ring in the barbituric acid is linked to a carbon atom of the ring in the hydantoin.

7. A new product consisting essentially of the reaction product of a barbituric acid and a hydantoin, wherein a carbon atom in a side chain in the barbituric acid is linked to a carbon atom in a side chain in the hydantoin.

SIMON L. RUSKIN.